US012638898B2

(12) United States Patent
Gopalakrishnan et al.

(10) Patent No.: US 12,638,898 B2
(45) Date of Patent: May 26, 2026

(54) TECHNOLOGY TO DETECT POWER CONSUMPTION AND LOW POWER STATES IN EXTERNAL SINK DEVICES TO ENHANCE SYSTEM PERFORMANCE AND IMPROVE USER EXPERIENCES

(71) Applicant: Intel Corporation, Santa Clara, CA (US)

(72) Inventors: Venkataramani Gopalakrishnan, Folsom, CA (US); Chuen Ming Tan, Bayan Lepas (MY); Divagar Mohandass, Pondicherry (IN); Dmitriy Berchanskiy, Roseville, CA (US); Nirmala Bailur, Bangalore (IN); Timothy Smith, Rancho Cordova, CA (US); Rajaram Regupathy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 17/732,096

(22) Filed: Apr. 28, 2022

(65) Prior Publication Data

US 2023/0350479 A1     Nov. 2, 2023

(51) Int. Cl.
*G06F 1/3215*     (2019.01)
*G06F 1/3212*     (2019.01)
*G06F 1/3296*     (2019.01)

(52) U.S. Cl.
CPC .......... *G06F 1/3215* (2013.01); *G06F 1/3212* (2013.01); *G06F 1/3296* (2013.01)

(58) Field of Classification Search
CPC ..... G06F 1/3215; G06F 1/3212; G06F 1/3296
See application file for complete search history.

(56) References Cited

U.S. PATENT DOCUMENTS

| | | | |
|---|---|---|---|
| 11,940,855 B2 | 3/2024 | Umapathy et al. | |
| 2013/0111226 A1* | 5/2013 | Ananthakrishnan | ........................ G06F 1/3243 713/300 |
| 2015/0277530 A1* | 10/2015 | Rathnakar | ............... G06F 1/324 713/323 |
| 2019/0086994 A1* | 3/2019 | Regupathy | ............ G06F 1/3215 |
| 2019/0124262 A1* | 4/2019 | El Kolli | ................. H04N 7/181 |
| 2021/0109578 A1* | 4/2021 | Umapathy | ................ G06F 1/26 |

OTHER PUBLICATIONS

U.S. Appl. No. 17/068,709 entitled "Apparatus and Method for Dynamic Reallocation of Processor Power," filed on Oct. 12, 2020, 54 pages.
USB 3.0 Promoter Group, "Universal Serial Bus Type-C Cable and Connector Specification," Release 2.0, Aug. 2019, 373 pages.
(Continued)

*Primary Examiner* — Jaweed A Abbaszadeh
(74) *Attorney, Agent, or Firm* — NICHOLSON DE VOS WEBSTER & ELLIOTT LLP

(57) ABSTRACT

Systems, apparatuses and methods may provide for technology that allocates a portion of operational power in a source device to an external sink device in response to a connection of the external sink device to the source device, detects a low power state with respect to the external sink device, and decreases the portion of operational power allocated to the external sink device in response to the low power state.

16 Claims, 11 Drawing Sheets

(56)                    References Cited

OTHER PUBLICATIONS

PCI Express, "PCI Express Base Specification Revision 6.0", Version 1.0, Dec. 16, 2021, 1923 pages.
Unified Efi Forum, Inc., "Advanced Configuration and Power Interface Specification", Version 6.2, May 2017, 1192 pages.
USB 3.0 Promoter Group, "Universal Serial Bus 3.2 Specification", Revision 1.1, Jun. 2022, 569 pages.

* cited by examiner

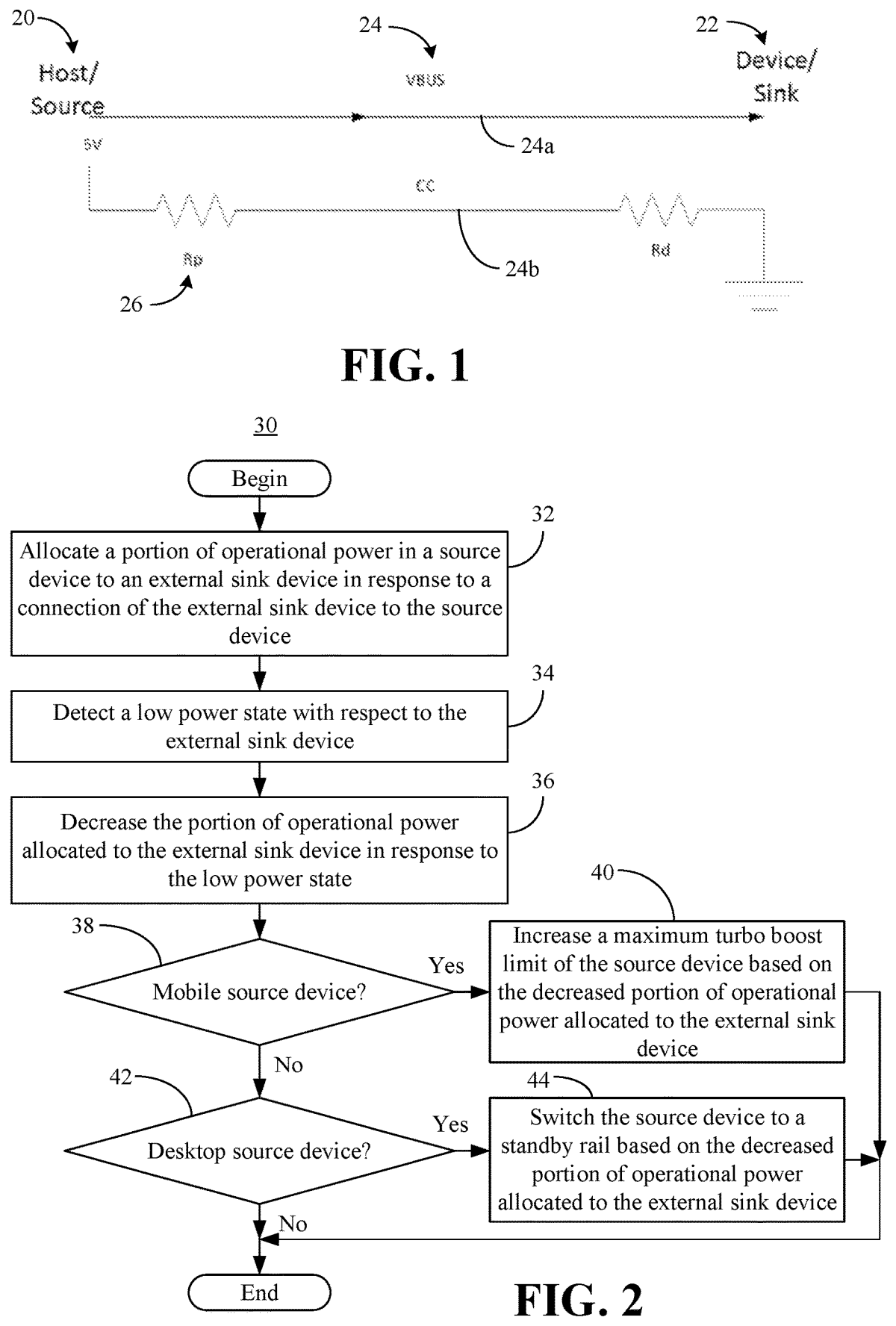

20

Host/
Source

24

VBUS

22

Device/
Sink

Begin

Allocate a portion of operational power in a source device to an external sink device in response to a connection of the external sink device to the source device

32

Detect a low power state with respect to the external sink device

34

Decrease the portion of operational power allocated to the external sink device in response to the low power state

36

38

Mobile source device?

Yes

Increase a maximum turbo boost limit of the source device based on the decreased portion of operational power allocated to the external sink device

40

No

42

Desktop source device?

Yes

Switch the source device to a standby rail based on the decreased portion of operational power allocated to the external sink device

44

No

End

FIG. 2

TECHNOLOGY TO DETECT POWER CONSUMPTION AND LOW POWER STATES IN EXTERNAL SINK DEVICES TO ENHANCE SYSTEM PERFORMANCE AND IMPROVE USER EXPERIENCES

TECHNICAL FIELD

Embodiments generally relate to power management. More particularly, embodiments relate to technology to detect power consumption and low power states in external sink devices to enhance system performance and improve user experiences.

BACKGROUND

Universal Serial Bus (USB) technology (e.g., Universal Serial Bus Type-C Cable and Connector Specification, Release 2.0, August 2019, USB Implementers Forum) provides for charging and/or operating power to be supplied from a source device (e.g., notebook computer, desktop computer, etc.) to one or more external sink devices (e.g., keyboard, mouse, game controller, power bank, smart phone, etc.) connected to the source device. The amount of power supplied to each sink device is typically determined and fixed when the sink device is connected to the source device based on the total power available from the source device and the power demands of all sink devices receiving power from the source device. If the power needs of a sink device decrease, however, the source device may continue to provide the originally allocated amount of power to the sink device in question. As a result, a negative impact on performance and/or energy regulatory body compliance may be encountered in the source device.

BRIEF DESCRIPTION OF THE DRAWINGS

The various advantages of the embodiments will become apparent to one skilled in the art by reading the following specification and appended claims, and by referencing the following drawings, in which:

FIG. 1 is a schematic diagram of an example of a connection between a source device and an external sink device according to an embodiment;

FIG. 2 is a flowchart of an example of a method of operating a performance-enhanced source device according to an embodiment;

DETAILED DESCRIPTION OF EMBODIMENTS

Figure 3A:
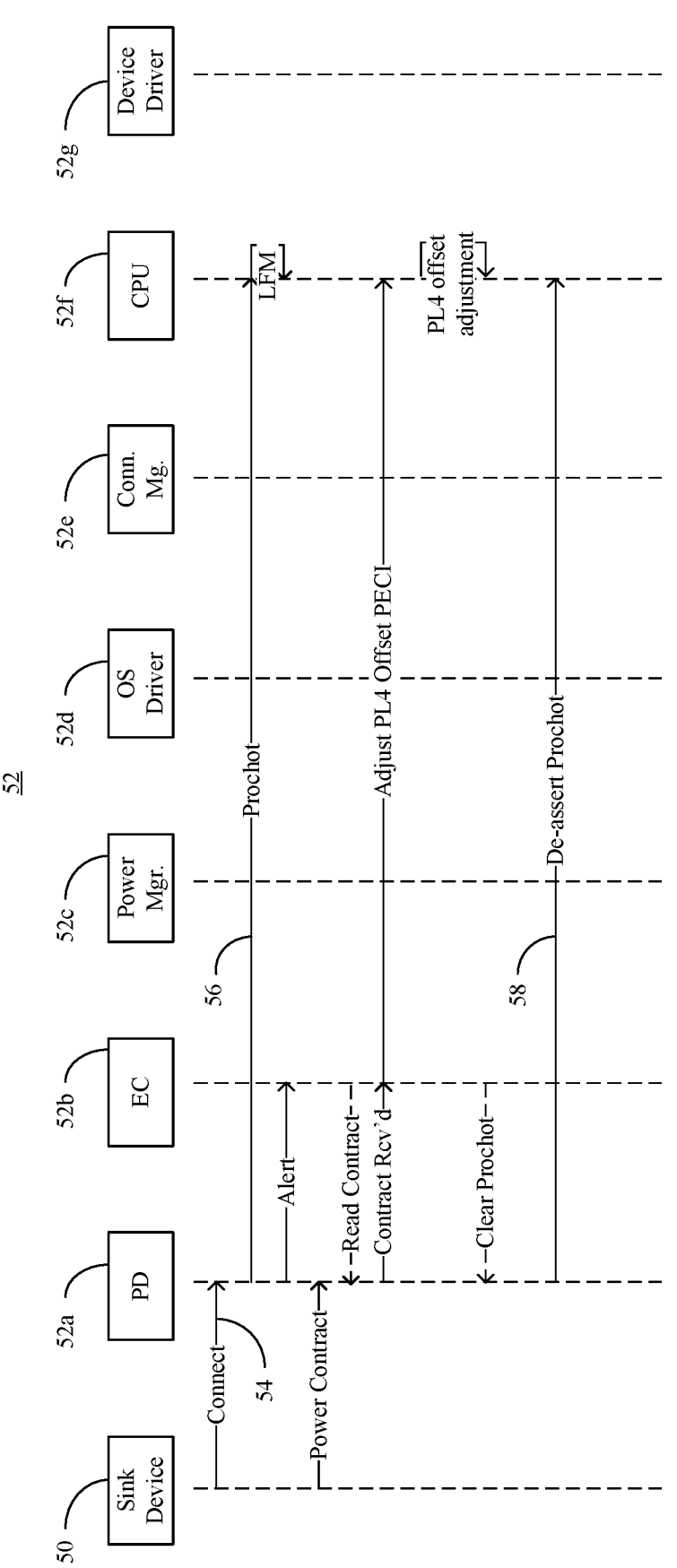
FIG. 3A is a signaling diagram of an example of a basic input output system (BIOS) or operating system (OS) phase in response to a connection of an external sink device to a source device according to an embodiment.

Turning now to FIG. 1, a connection 24 (24a, 24b, e.g., USB Type-C connection, THUNDERBOLT connection, etc.) between a source device 20 (e.g., host such as a mobile/notebook computer or desktop computer) and an external sink device 22 (e.g., keyboard, mouse, game controller, power bank, smart phone, etc.) is shown. Depending on the circumstances, the source device 20 and the external sink device 22 may swap producer/consumer roles. In the illustrated example, the connection 24 includes a voltage bus 24a (VBUS) that provides charging and/or operating power to the external sink device 22. The connection 24 may also include a configuration channel 24b (CC) that is used to determine how much operational power in the source device 20 to allocate to the external sink device 22. The amount of operational power to be allocated to the external sink device 22 may be established via an implicit power setting and/or an explicit power setting.

For example, the external sink device 22 might be a USB Type-C device that is governed by a power delivery contract, wherein the power delivery contract is either implicitly or explicitly established with the source device 20. The power delivery contract defines the operational power of the external sink device 22 as defined by USB specifications. Table I below demonstrates that an implicit contract may occur through the configuration channel 24b, where the source device 20 pulls up the configuration channel 24b to different pull-up resistance (Rp) values 26 to indicate different current values as defined by USB interface specifications. Explicit contract devices rely on protocol negotiation to determine the power contract.

TABLE I

| Source Advertisement | Resistor Pullup to 4.75-5.5 V | Resistor Pullup 3.3 V +/− 5% |
|---|---|---|
| 900 mA@5 Volts (V) | 56k ohms | 36k ohms |
| 1.5 A@5 V | 22k ohms | 12k ohms |
| 3 A@5 V | 10k ohms | 4.7k ohms |

As will be discussed in greater detail, if the source device 20 is a mobile system, a challenge may be to determine the actual power consumption from the external sink device 22 because the power contract only defines the maximum operational power and is not reflective of the actual power that the external sink device 22 is consuming at any given moment in time. When the external sink device 22 goes into a low power state such as, for example, the Advanced Configuration and Power Interface (e.g., ACPI Specification, Rev. 6.2, May 2017) D3 mode, the power pre-allocated to the external sink device 22 from the source device 20 typically remains with the external sink device 22 and does not scale down with the actual consumption under conventional approaches.

Accordingly, the central processing unit (CPU, e.g., host processor) of the source device 20 might continue to work at lower speeds under conventional approaches as there is no existing mechanism to determine the power consumption and eventually reclaim power. Indeed, devices such as human interface devices (HIDs, e.g., keyboards, mice, game controllers) or USB drives often do not consume the maximum allocated implicit power. Moreover, if the source device 20 is a desktop system, conventional solutions may lack policies that allow the desktop system to switch to a standby voltage rail to meet energy regulatory body compliance depending on the actual power consumption of the external sink device 22.

Technology described herein uses different approaches for implicit and explicit contract devices to improve performance and regulatory compliance. Explicit contract devices rely on the ability of a power delivery (PD) controller (not shown) of the source device 20 to monitor and measure the voltage bus 24a load to improve overall system performance and the user experience. For example, the PD controller may report the current drawn in regular intervals to an embedded controller (EC, not shown) of the source device 20, wherein the EC consumes the data and enables the CPU and/or graphics processor (e.g., "Gfx") of the source device 20 to reclaim power when the external sink device 22 is in a low power state. Power reclamation enables the source device 20 to achieve improved CPU and Gfx performance. Embodiments also include enhanced routines involving OS and platform components to take advantage of low power state transitions by connected devices for power reclamation. Implicit contract devices such as HID and USB peripherals consume far less than the contracted power (e.g., as advertised in configuration descriptors "bMaxPower" field). Embodiments take advantage of this advertisement to determine the amount of power pre-allocated to the device by the CPU (e.g., preventing oversubscription).

In desktop systems, embodiments enable customers to implement policies that would allow the source device 20 to switch to an Advanced Technology eXtended (ATX) standby rail depending on the actual power consumption of the external sink device 22. Thus, the technology described herein represents an improvement over existing ecosystems in which the platform reserves the maximum amount of power due to a lack of knowledge within the system, even though the connected USB devices require less power from the system. In a battery-powered device executing, for example, a graphics intensive application, a processing unit (e.g., CPU, host processor, graphics processing unit/GPU, graphics processor, Neural processing Unit/NPU) may be permitted to execute at an operating frequency (e.g., turbo boost mode) that is higher than the rated operating frequency for relatively long periodic bursts. Embodiments therefore enhance system performance by increasing turbo max limits (e.g., power level four/PL4), which in turn improves the user experience and provides more efficient usage of system resources.

More particularly, embodiments provide two different approaches of determining the current drawn by the external sink device 22 (e.g., port partner device) including an updated methodology for the OS to detect low power state transitions of the external sink device 22 and updating peak power limits depending on the actual power consumption of the external sink device 22. Mobile and desktop systems with an EC may rely on "Approach One" while desktop platforms without an EC might rely on "Approach Two".

Approach One: This technology uses current monitoring capability of PD controllers to constantly update the steady state and peak current into host interface registers of the PD controllers. The EC or a system policy manager (e.g., host)

reads the registers through an inter-integrated circuit ($I^2C$) interface and updates the CPU with the modified peak power limit when requested by the OS.

Approach Two: In this technology, the PD queries the external sink device 22 for the battery capacity of the external sink device 22 to determine if the external sink device 22 is sufficiently charged or fully charged before switching to the ATX standby rail.

The technology described herein therefore improves CPU/Gfx performance for all mobile systems by reclaiming power during device low power states. On desktop systems, the technology switches to a standby rail depending on the actual device power consumption (e.g., supporting use cases such as charging of phones/power banks while still meeting energy regulatory requirements).

Another aspect of the technology described herein reclaims the power reserved for platform plug and play (PnP) devices through device configuration descriptors and uses the reclaimed power to improve CPU power limits. For example, the source device 20 might include an interface (e.g., application programming interface/API) for the OS to update the real power requirement retrieved from the descriptors provided by the external sink device 22. After successful retrieval, the OS updates platform firmware on the power requirements through the interfaces to reclaim the power reserved for the rest of the platform. Finally, the platform firmware may use the reclaimed power to improve the turbo capability of the CPU by updating the peak power limits.

FIG. 2 shows a method 30 of operating a source device. The method 30 may generally be implemented in a source device such as, for example, the source device 20 (FIG. 1). More particularly, the method 30 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

The illustrated processing block 32 provides for allocating a portion of operational power in the source device to an external sink device in response to a connection (e.g., plug and play connection) of the external sink device to the source device. In an embodiment, block 32 allocates the portion of operational power in accordance with one or more of an explicit power setting/contract or an implicit power setting/contract. Block 34 detects a low power state with respect to the external sink device. In one example (e.g., Approach One), block 34 tracks a power consumption measurement (e.g., via a PD controller and/or EC) with respect to the external sink device. In another example, (e.g., Approach Two), block 34 determines that a battery capacity of the external sink device has exceeded a threshold (e.g., 90%). Block 36 decreases the portion of operational power allocated to the external sink device in response to the low power state.

In an embodiment, block 38 determines whether the source device is a mobile system/platform (e.g., notebook computer based on internal configuration information of the source device). If so, block 40 increases a maximum turbo boost limit of the source device based on the decreased portion of operational power allocated to the external sink device. Thus, if block 36 decreases the portion of operational power allocated to the external sink device by 300 milli-Watts (mW), block 40 might increase the maximum turbo boost limit by 300 mW. If it is determined at block 38 that the source device is not a mobile system/platform, block 42 determines whether the source device is a desktop system/ platform (e.g., based on internal configuration information of the source device). If so, block 44 switches the source device to a standby rail based on the decreased portion of operational power allocated to the external sink device. If it is determined at block 42 that the source device is not a desktop system/platform (e.g., another type of computing system), the method 30 may bypass blocks 40 and 44 and terminate. The method 30 therefore enhances performance at least to the extent that reclaiming power originally allocated to the external sink device enables the source device to operate at higher frequencies and/or reduce power consumption.

Turning now to FIG. 3A, a BIOS or OS phase is shown in which a sink device 50 is connected to a source device 52 (52a-52g) including a PD controller 52a, an EC 52b, a power manager 52c (e.g., ACPI manager), an OS driver 52d (e.g., USB connector manager/UCM), a connection manager 52e (e.g., WINDOWS connection manager, LINUX connection manager), a CPU 52f, and a device driver 52g. Peak power limits are adjusted when the external sink device 50 is attached and/or detached to the source device 52. During an attach event 54, the peak power limit is set based on the power contract with the external sink device 50, wherein the amount of power contracted for is subtracted from the overall budget of the source device 52 before the external sink device 50 starts sinking. This adjustment is achieved by the PD controller 52a asserting a "PROCHOT" signal 56, which lowers the operating frequency of the CPU 52f, immediately giving ample time for the EC 52b to update the peak power limit. After the update, the PD controller 52a deasserts 58 the PROCHOT signal. These operations are repeated whenever the power contract changes.

Figure 3B:
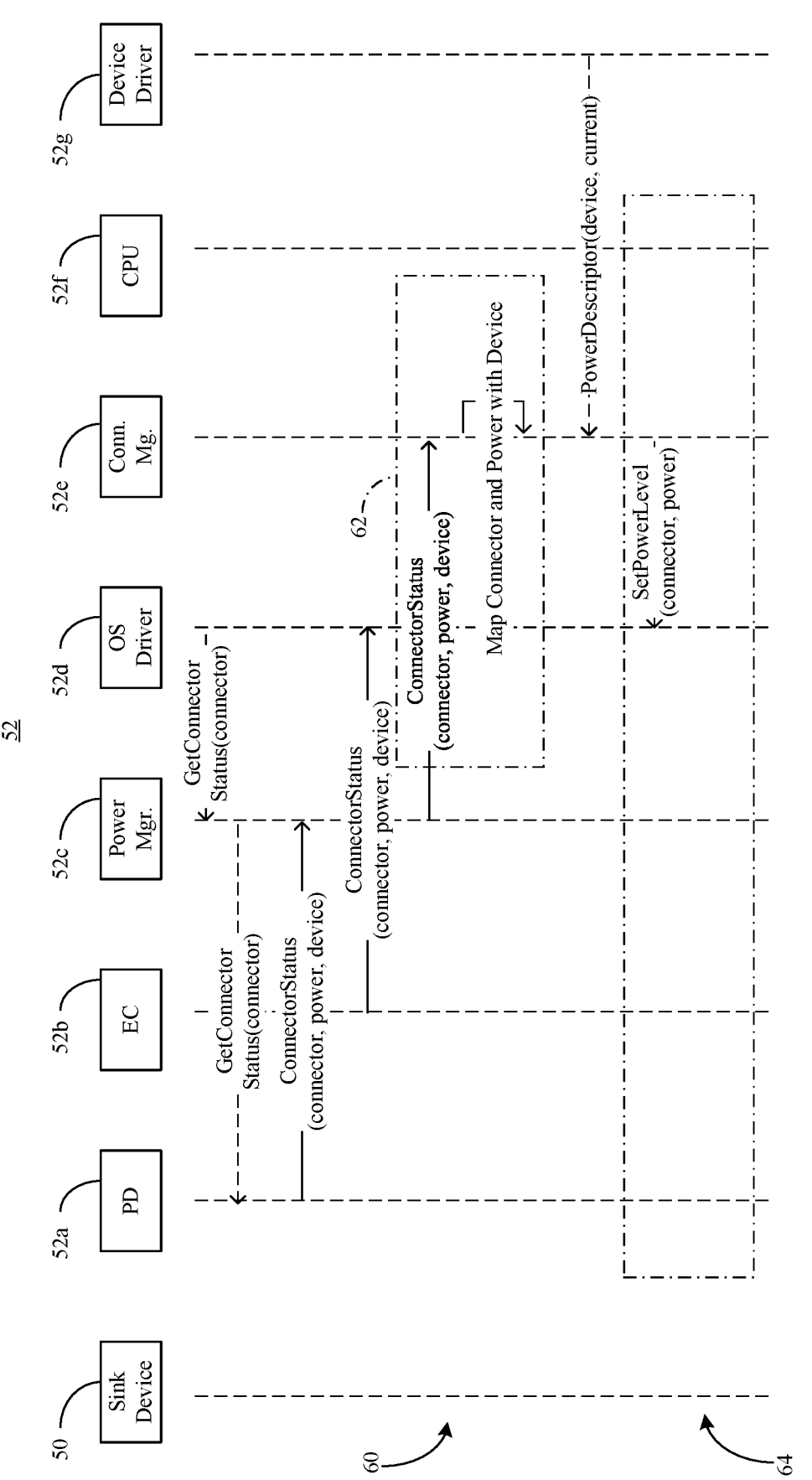
FIG. 3B is a signaling diagram of an example of OS phases to map a connector to an external sink device and fine tune power according to an embodiment.

FIG. 3B shows an OS mapping phase 60 in which the connector status is notified to the connection manager 52e via the OS driver 52d. To be able to map the connector to connected devices in a new subroutine 62, a new ACPI group is defined under the USB-C connector (CRx) object on a per connector basis. ACPI grouping procedures advertise all possible ACPI objects that could enumerate behind a Type-C connector. The ACPI grouping allows for defining a minimum (min) and maximum (max) power for the port. The max power correlates with the PD contract and the min power correlates with the standby power requirements of the device (e.g., as defined in the appropriate specification). In the example below for an external sink device that supports both USB and Peripheral Component Interconnect Express (PCI-e, e.g., PCI Express® Base Specification 6.0, Version 1.0, Jan. 11, 2022, PCI Special Interest Group) tunneling, the max power is 15 W and min power for standby requirement is 50 mW. An OS fine tuning phase 64 then adjusts the power.

Example Association:

6

```
Package( ){"\\_SB.UBTC.CR01",
  1,
  Package( ){"\\_SB.PCI0.XHC0.SS03",
    Package( ){0, 15000},
    Package( ){1, 50}}},
  Package( ){"\\_SB.PCI0.TRP1",
    Package( ){0, 15000},
    Package( ){1, 50}}},
}
```

TABLE II

| Connector ID | Collection Objects | Max Power | Min Power |
|---|---|---|---|
| C1 | \_SB.UBTC.CR01 \_SB.PCI0.XHC0.SS03 \_SB.PCI0.TRP1 | 15 W | 50 mW |

Figure 4:
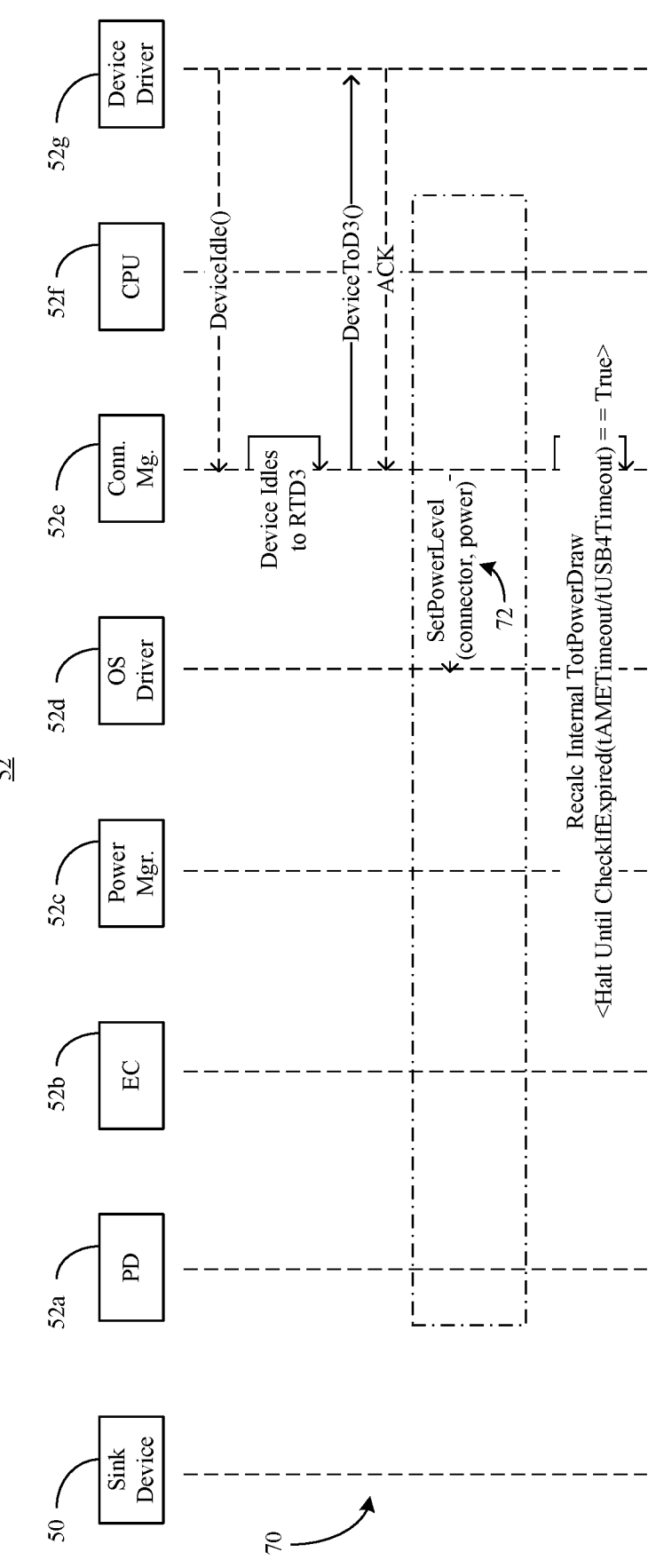
FIG. 4 is a signaling diagram of an example of an entry of an external sink device into a D3 device power mode according to an embodiment.

FIG. 4 shows a D3 entry routine 70. When the sink device 50 idles to the runtime D3 mode (RTD3), the connection manager 52e issues a set power limit command 72 to the OS driver 52d with the power level set to the min value as defined in the ACPI grouping.

Figure 5:
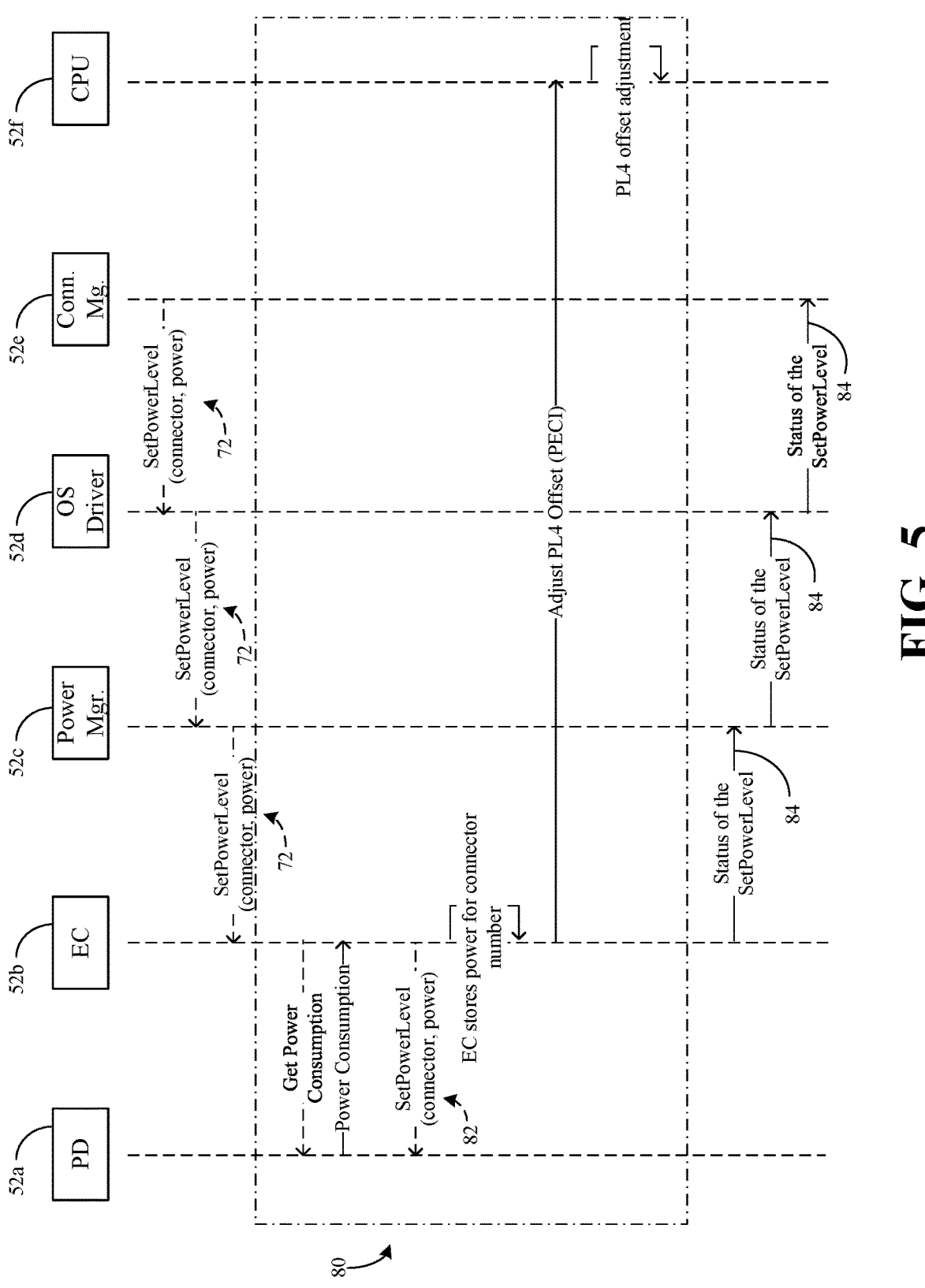
FIGS. 5 and 6 are signaling diagrams of examples of power adjustment routines in response to D3 power mode entries according to embodiments.

FIG. 5 shows a power adjustment routine 80 in response to a D3 entry. In the illustrated example, the EC 52b receives the set power limit command 72 and, being a policy manager (PPM), overrides the command 72 with a different set power limit command 82 based on the current/power level reported by the PD controller 52a. The different set power limit command 82 enables the PD controller 52a to negotiate to a new power contract/setting. After receiving an acknowledgment from PD controller 52a on the new power contract change, the EC 52b also uses a status message 84 to update the package peak power limit (e.g., PL4 offset) with the new power level via a platform environment control interface (PECI). In this case, it is expected for the new power limit to be higher than the initial contract level, which provides improved CPU and Gfx performance during peak power events (e.g., "PL4 events").

Figure 6:
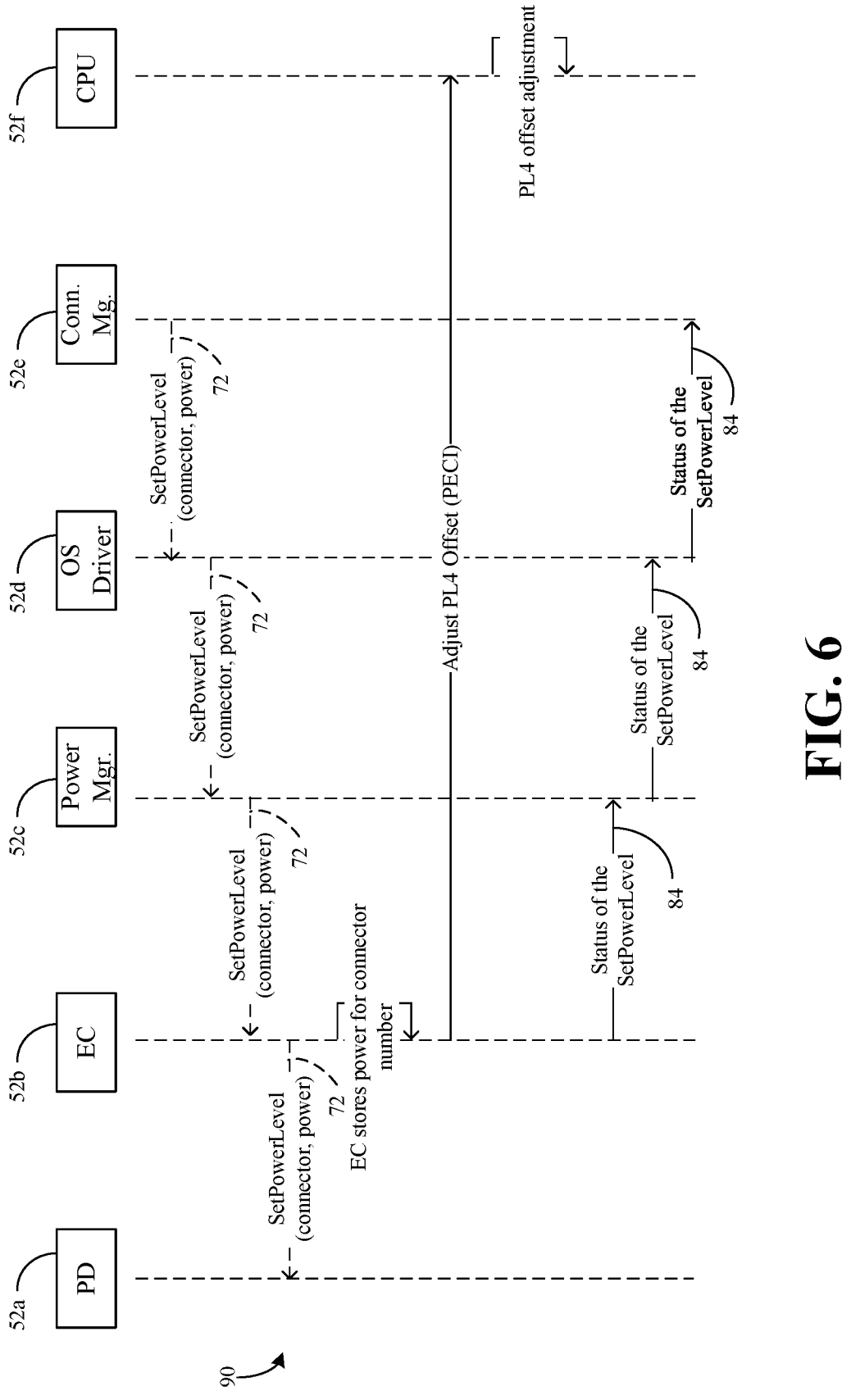

FIG. 6 shows another power adjustment routine 90 in response to a D3 entry. In the illustrated example, the PD controller 52a does not report the power currently consumed by the device. Rather, the EC 52b uses the power level reported by the OS as part of the original power level set command 72.

Figure 7:
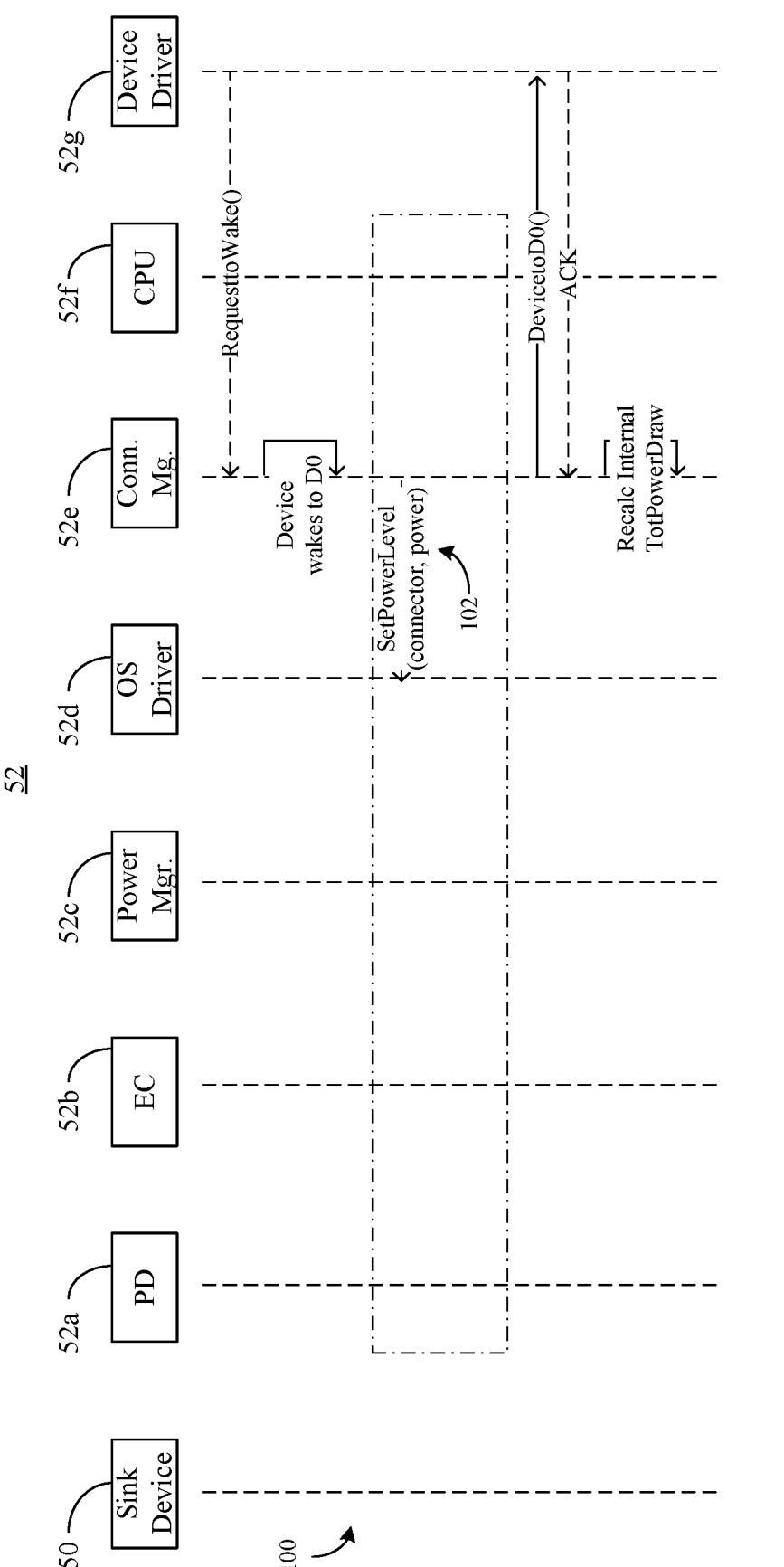
FIG. 7 is a signaling diagram of an example of an exit of an external sink device from a D3 power mode according to an embodiment.

FIG. 7 shows a D3 exit routine 100. When the sink device 50 exits from D3 (low power) to D0 (active), the connection manager 52e instructs the OS driver to issue a set power limit command 102 to the PD controller 52a with the power level set to the max value as defined in the ACPI grouping.

Figure 8:
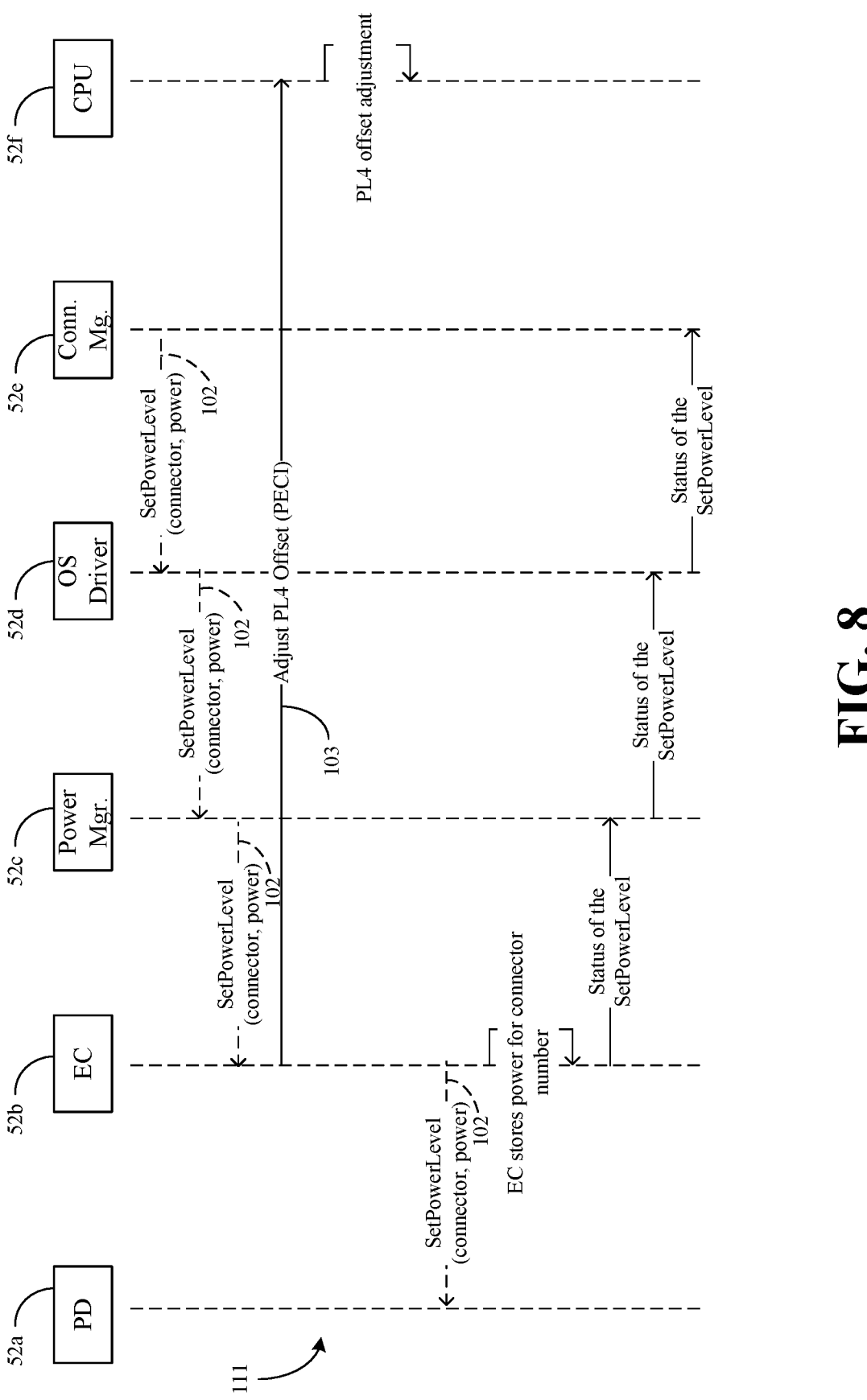
FIG. 8 is a signaling diagram of an example of a power adjustment routine in response to a D3 power state exit according to an embodiment.

FIG. 8 shows a power adjustment routine 111 in response to a D3 exit. In the illustrated example, the EC 52b receives the command 102 and issues a message 103 to update the system on chip (SoC) package peak power limit via the PECI interface before forwarding the command 102 to the PD controller 52a. This approach ensures that the package can operate within the new peak power limit as set by the OS/EC 52b before providing the power back to the sink device. In this case it, is expected for the new power limit to be lower than the when the sink device was in D3, which lowers the CPU and Gfx performance during peak power events. After receiving an acknowledgment from the dynamic thermal framework on the peak power limit update, the EC 52b also notifies the PD controller 52a, which then establishes a new PD contract/setting (e.g., restoring the contract/setting back to the original values).

Figure 9:
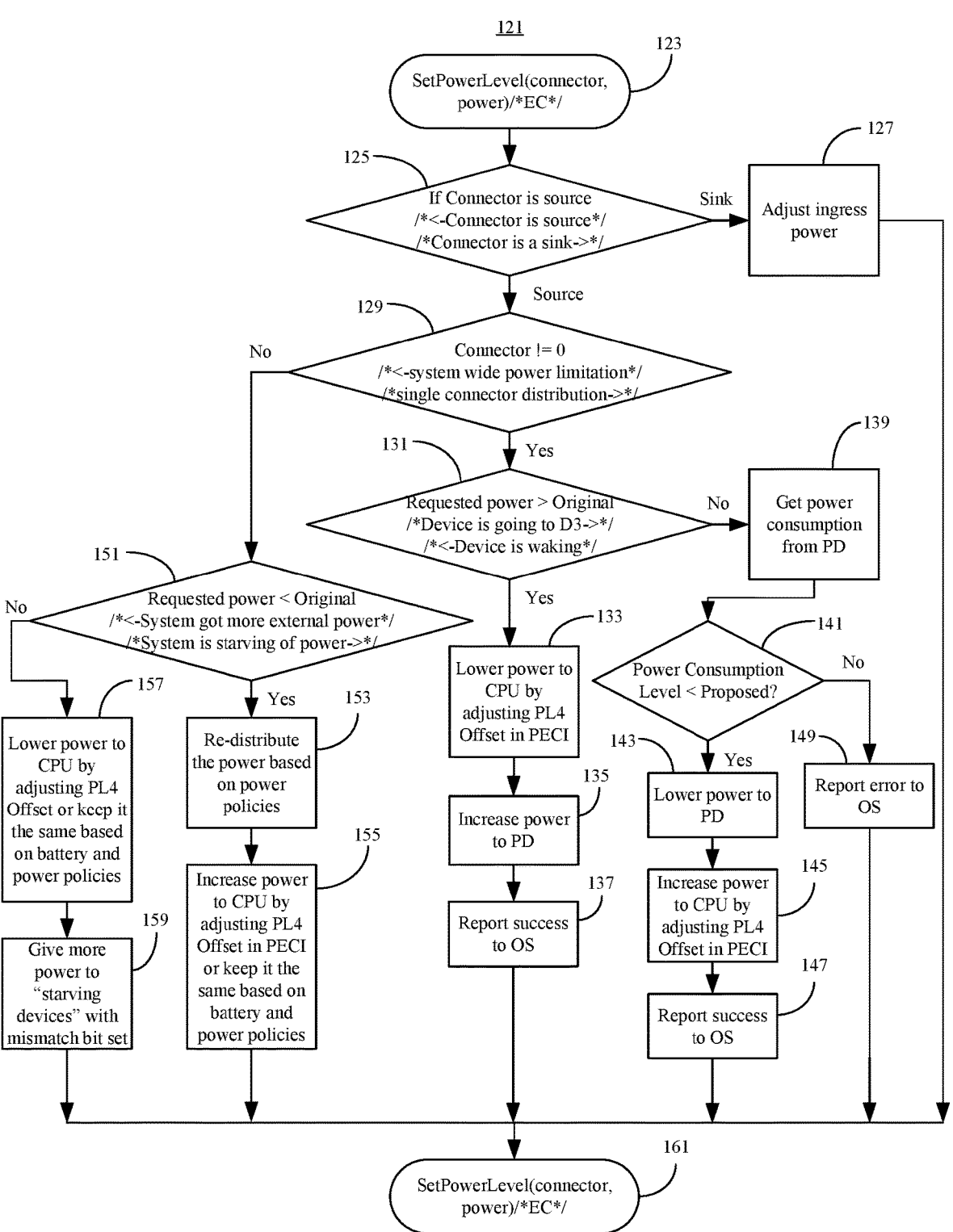
FIG. 9 is a flowchart of an example of a method of reclaiming allocated power according to an embodiment.

FIG. 9 shows a method 121 of reclaiming allocated power. The method 121 may generally be implemented in a source device such as, for example, the source device 20 (FIG. 1) and/or the source device 52 (FIGS. 3A-8). More particularly, the method 121 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof.

When the EC receives the set power limit command for a port from the OS at block 123, the EC first checks at block 125 whether the port is in a provider (e.g., source) role or a consumer (e.g., sink) role. If the port is in the sink/consumer role, then the ingress power is limited at block 127 and the illustrated method 121 terminates. If the port is in the source/provider role and it is determined at block 129 that the command is not a broadcast command (e.g., system wide power limitation), then the EC checks for the requested power for the individual port at block 131. The requested power being greater than the original is an indication that the sink device is exiting from RTD3 and the power levels are to be restored to the original value. In such a case, the EC updates the PL4 offset via the PECI interface at block 133 and, after restoring the power in block 135, updates the PD controller to reflect the change in PD contract and reports success to the OS at block 137.

If it is determined at block 131 that the requested power is less than the original value, then the device is entering RTD3, and the peak power limit is going to be higher. Accordingly, the EC reads the reported power by PD at block 139 and determines whether the power consumption level is less than the proposed power level at block 141. If so, block 143 uses the reported power to establish a new PD contract, block 145 updates the PL4 offset via the PECI interface, and block 147 reports success to the OS. If it is determined at block 141 that the power consumption level is not less than the proposed power level, then block 149 reports an error to the OS.

If it is determined at block 129 that the EC has received a broadcast command from the OS to update all the ports, the EC follows the same concept as for single port and updates the CPU power limits via the PECI interface for improved CPU and Gfx performance whenever the devices are in D3. Thus, block 151 determines whether the requested power is less than the original value. If so, block 153 re-distributes the power based on the power policies and block 155 increases power to the CPU by adjusting the PL4 offset via the PECI interface or keeps the power the same based on battery and power policies. Otherwise, block 157 lowers the power to the CPU by adjusting the PL4 offset via the PECI interface or keeps the power the same based on the battery and power policies, and block 159 provides more power to "starving devices" with a mismatched bit set. More particularly, the sink device may request more power up to a maximum amount by setting a bit known as a "capability mismatch" bit, which allows the source device to provide more power to the sink device, if available. The method 121 then sets the power level at block 161.

Figure 10:
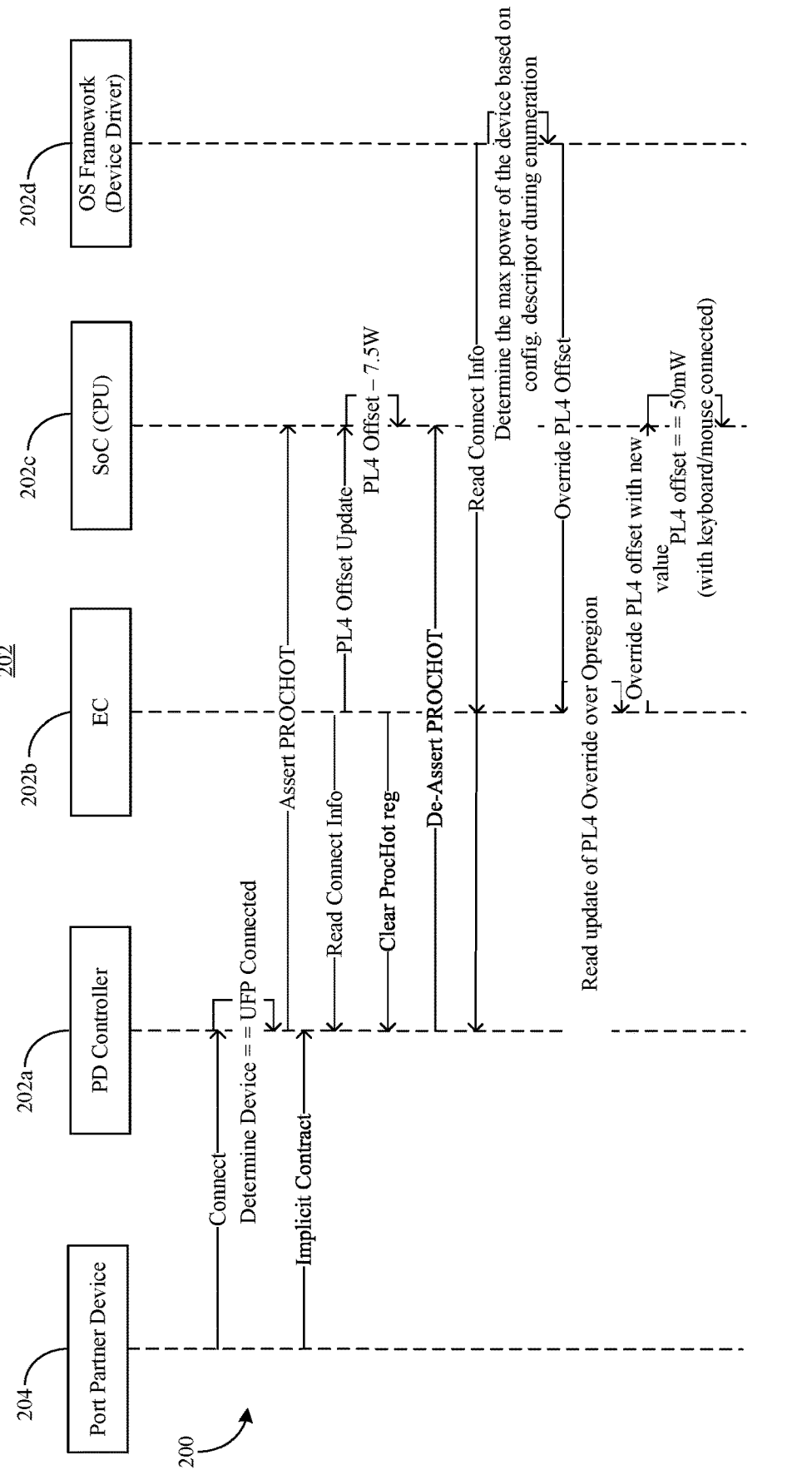
FIG. 10 is a signaling diagram of an example of a routine to reclaim power according to an embodiment.

FIG. 10 shows a power reclamation routine 200 for a source device 202 (202a-202d) including a PD controller 202a, an EC 202b, an SoC 202c (e.g., including a CPU), and an OS framework 202d (e.g., including a device driver). When a port partner device 204 (e.g., external plug and play sink device) is connected to the source device 202, the PD Controller 202a instructs the CPU to operate in low frequency mode (LFM), as there will be a change in the system power reserve. After successful power negotiation, the EC 202b instructs the CPU firmware to update the PL4 offset to ensure that the system power consumption is within the available power budget.

Once the port partner device 204 is properly configured, the OS framework 202d queries via the EC the port status and the power configurations. The OS may then use ACPI methods to update the power reserve after parsing the descriptors and change the PL4 offset to a higher optimal value.

If the source device 202 is a desktop system with the EC 202b, during low power system transitions, the EC 202b can determine the power consumed by the port partner device 204 as reported by PD controller 202a. If the power consumed is within the budget allocated for Type-C devices based on ATX standby capacity, the source device 202 can switch to a standby rail. This approach is particularly useful in supporting the following use cases:

Allow the charging of phones or power banks during standby state. When the device is charging, and host ports are sourcing, the EC 202b will not permit switches to the standby rail. When the device has completed charging and is not drawing any power then EC will allow ATX to switch to standby rail.

Allowing bus powered alternate mode devices to support wake when particularly these devices are consuming significant power even in idle scenarios (e.g., THUNDERBOLT bus powered devices or devices that require 3 W during standby). When wakes are disabled, the EC 202b can allow switches to the standby rail. When wakes are enabled, the EC 202b can prevent switches to the standby rail.

As already noted, another approach determines whether the port partner device 204 has completed charging. In such a case, the PD controller 202a queries the battery capacity of the port partner device 204. If the device is, for example, >90% charged, then the above policies can be implemented.

```
If (Low power entry)
Approach Two
If (PD3.0 sink device)
    Get_battery_cap_message
    While (Battery last full charge<=90% of Design capac-
      ity):
    {
    Sleep
        Get_battery_cap_message
    Maintain PD contract
    }
End of code
```

Figure 11:
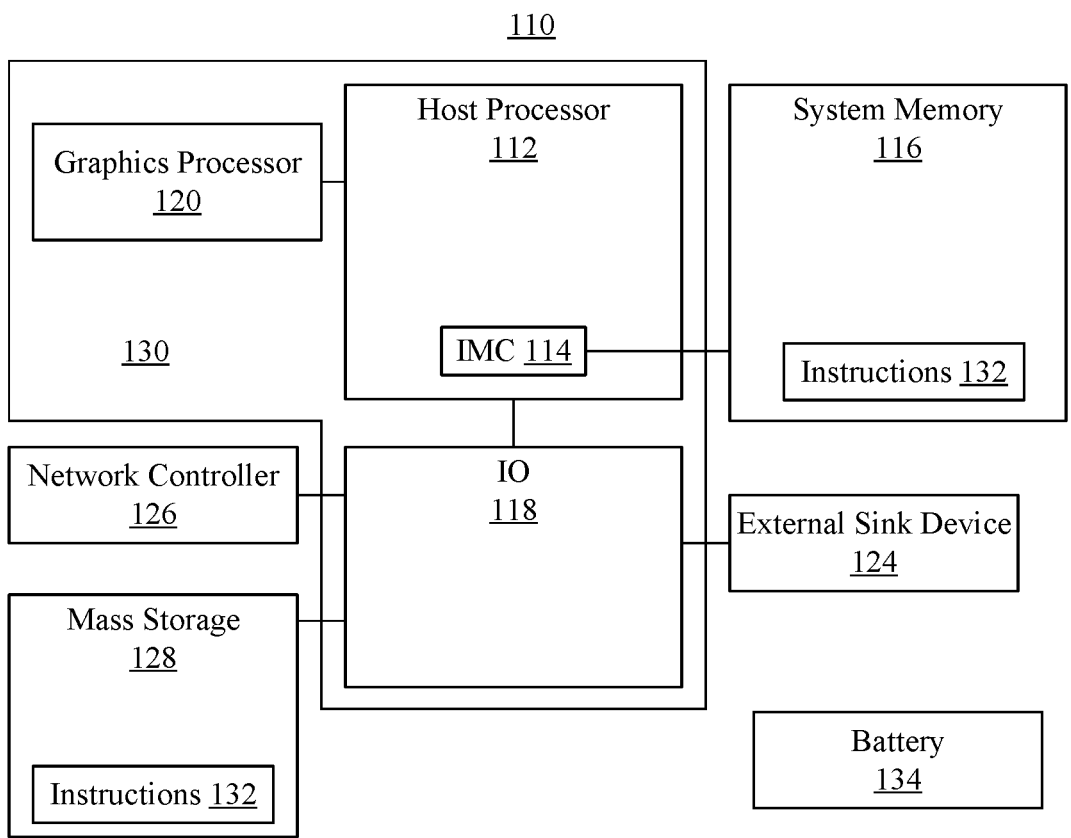
FIG. 11 is a block diagram of an example of a performance-enhanced computing system according to an embodiment.

Turning now to FIG. 11, a performance-enhanced computing system 110 (e.g., source device) is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 110 includes a host processor 112 (e.g., CPU) having an integrated memory controller (IMC) 114 that is coupled to a system memory 116. In an embodiment, an IO module 118 is coupled to the host processor 112. The illustrated IO module 118 communicates with, for example, a network controller 126 (e.g., wired and/or wireless), and a mass storage 128 (e.g., hard disk drive/HDD, optical disc, solid-state drive/SSD, flash memory, etc.). The system 110 may also include a graphics processor 120 (e.g., graphics processing unit/GPU) that is incorporated with the host processor 112 and the IO module 118 into a system on chip (SoC) 130. The computing system 110 also includes a battery 134 that provides a battery output.

In one example, the mass storage 128 and/or the system memory 116 include instructions 132, which when executed by the SoC 130 and/or the host processor 112, causes the SoC 130, the host processor 112 and/or the computing system 110 to implement one or more aspects of the method 30 (FIG. 2) and/or the method 121 (FIG. 9), already discussed. Thus, execution of the instructions 132 causes the SoC 130, the host processor 112 and/or the computing system 110 to allocate a portion of operational power in the computing system 110 to an external sink device 124 in response to a connection of the external sink device 124 to the computing system 110, detect a low power state with respect to the external sink device 124 (e.g., based on power consumption measurements and/or battery capacity), and decrease the portion of the operational power allocated to the external sink device 124 in response to the low power state. The computing system 110 is therefore considered performance-enhanced at least to the extent that reclaiming power originally allocated to the external sink device 124 enables the computing system 110 to operate at higher frequencies and/or reduce power consumption.

Figure 12:
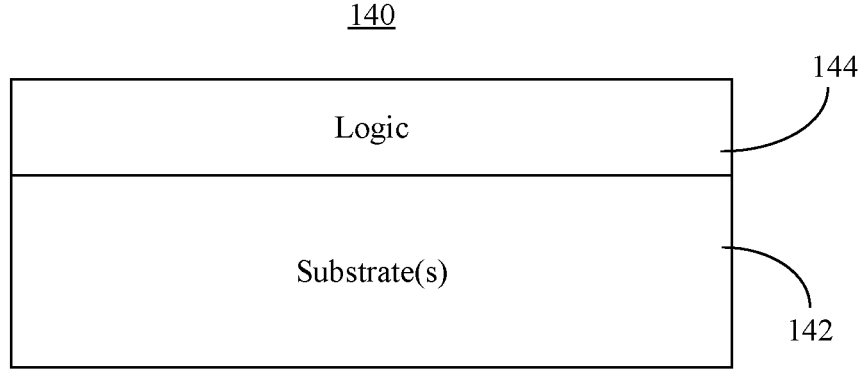
FIG. 12 is an illustration of an example of a semiconductor package apparatus according to an embodiment.

FIG. 12 shows a semiconductor apparatus 140 (e.g., chip and/or package). The illustrated apparatus 140 includes one or more substrates 142 (e.g., silicon, sapphire, gallium arsenide) and logic 144 (e.g., transistor array and other integrated circuit/IC components) coupled to the substrate(s) 142. In an embodiment, the logic 144 and implements one or more aspects of the method 30 (FIG. 2) and/or the method 121 (FIG. 9), already discussed.

The logic 144 may be implemented at least partly in configurable or fixed-functionality hardware. In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Additional Notes and Examples

Example 1 includes a performance-enhanced source device comprising a processing unit and a memory coupled to the processing unit, the memory including a set of instructions, which when executed by the processing unit, cause the processing unit to allocate a portion of operational power in the source device to an external sink device in response to a connection of the external sink device to the source device, detect a low power state with respect to the external sink device, and decrease the portion of operational power allocated to the external sink device in response to the low power state.

Example 2 includes the source device of Example 1, wherein the instructions, when executed, further cause the processing unit to increase a maximum turbo boost limit of the source device based on the decreased portion of operational power allocated to the external sink device.

Example 3 includes the source device of Example 1, wherein the instructions, when executed, further cause the processing unit to switch the source device to a standby rail based on the decreased portion of operational power allocated to the external sink device.

Example 4 includes the source device of Example 1, wherein to detect the low power state, the instructions, when executed, further cause the processing unit to track a power consumption measurement with respect to the external sink device.

Example 5 includes the source device of Example 1, wherein to detect the low power state, the instructions, when executed, further cause the processing unit to determine that a battery capacity of the external sink device has exceeded a threshold.

Example 6 includes the source device of any one of Examples 1 to 5, wherein the portion of operational power is to be allocated to the external sink device in accordance with one or more of an explicit power setting or an implicit power setting.

Example 7 includes at least one computer readable storage medium comprising a set of instructions, which when executed by a source device, cause the source device to allocate a portion of operational power in the source device to an external sink device in response to a connection of the external sink device to the source device, detect a low power state with respect to the external sink device, and decrease the portion of operational power allocated to the external sink device in response to the low power state.

Example 8 includes the at least one computer readable storage medium of Example 7, wherein the instructions, when executed, further cause the source device to increase a maximum turbo boost limit of the source device based on the decreased portion of operational power allocated to the external sink device.

Example 9 includes the at least one computer readable storage medium of Example 7, wherein the instructions, when executed, further cause the source device to switch the source device to a standby rail based on the decreased portion of operational power allocated to the external sink device.

Example 10 includes the at least one computer readable storage medium of Example 7, wherein to detect the low power state, the instructions, when executed, further cause the source device to track a power consumption measurement with respect to the external sink device.

Example 11 includes the at least one computer readable storage medium of Example 7, wherein to detect the low power state, the instructions, when executed, further cause the source device to determine that a battery capacity of the external sink device has exceeded a threshold.

Example 12 includes the at least one computer readable storage medium of any one of Examples 7 to 11, wherein the portion of operational power is to be allocated to the external sink device in accordance with one or more of an explicit power setting or an implicit power setting.

Example 13 includes a semiconductor apparatus comprising one or more substrates, and logic coupled to the one or more substrates, wherein the logic is implemented at least partly in one or more of configurable or fixed-functionality hardware, the logic to allocate a portion of operational power in a source device to an external sink device in response to a connection of the external sink device to the source device, detect a low power state with respect to the external sink device, and decrease the portion of operational power allocated to the external sink device in response to the low power state.

Example 14 includes the semiconductor apparatus of Example 13, wherein the logic is further to increase a maximum turbo boost limit of the source device based on the decreased portion of operational power allocated to the external sink device.

Example 15 includes the semiconductor apparatus of Example 13, wherein the logic is further to switch the source device to a standby rail based on the decreased portion of operational power allocated to the external sink device.

Example 16 includes the semiconductor apparatus of Example 13, wherein to detect the low power state, the logic is to track a power consumption measurement with respect to the external sink device.

Example 17 includes the semiconductor apparatus of Example 13, wherein to detect the low power state, the logic is to determine that a battery capacity of the external sink device has exceeded a threshold.

Example 18 includes the semiconductor apparatus of any one of Examples 13 to 17, wherein the portion of operational power is to be allocated to the external sink device in accordance with one or more of an explicit power setting or an implicit power setting.

Example 19 includes a method of operating a performance-enhanced source device, the method comprising allocating a portion of operational power in the source device to an external sink device in response to a connection of the external sink device to the source device, detecting a low power state with respect to the external sink device, and decreasing the portion of operational power allocated to the external sink device in response to the low power state.

Example 20 includes the method of Example 19, further including increasing a maximum turbo boost limit of the source device based on the decreased portion of operational power allocated to the external sink device.

Example 21 includes the method of Example 19, further including switching the source device to a standby rail based on the decreased portion of operational power allocated to the external sink device.

Example 22 includes the method of Example 19, wherein detecting the low power state includes tracking a power consumption measurement with respect to the external sink device.

Example 23 includes the method of Example 19, wherein detecting the low power state includes determining that a battery capacity of the external sink device has exceeded a threshold.

Example 24 includes the method of any one of Examples 19 to 23, wherein the portion of operational power is allocated to the external sink device in accordance with one or more of an explicit power setting or an implicit power setting.

Example 25 includes an apparatus comprising means for performing the method of any one of Examples 19 to 24.

Technology described herein therefore improves CPU and Gfx performance by reclaiming power from USB Type-C ports and providing the reclaimed power back to the system for increased peak power limits. The technology also meets energy regulatory requirements while supporting use cases such as charging phones or power banks, even when the desktop platform is in system low power states (e.g., standby and/or ACPI Sx). Moreover, the technology optimizes, improves, and simplifies OS and firmware (FW) flows for CPU power reclamation.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A source device comprising:
a processing unit; and
a memory coupled to the processing unit, the memory including a set of instructions, which when executed by the processing unit, cause the processing unit to:

allocate a portion of operational power in the source device to an external sink device in response to a connection of the external sink device to the source device, detect a low power state with respect to the external sink device including determining that a battery capacity of the external sink device has exceeded a threshold, and decrease the portion of operational power allocated to the external sink device and cause the processing unit to increase a maximum turbo boost limit of the source device based on the decreased portion of operational power allocated to the external sink device in response to the low power state.

2. The source device of claim 1, wherein the instructions, when executed, further cause the processing unit to switch the source device to a standby rail based on the decreased portion of operational power allocated to the external sink device.

3. The source device of claim 1, wherein to detect the low power state, the instructions, when executed, further cause the processing unit to track a power consumption measurement with respect to the external sink device.

4. The source device of claim 1, wherein the portion of operational power is to be allocated to the external sink device in accordance with one or more of an explicit power setting or an implicit power setting.

5. At least one computer readable storage medium comprising a set of instructions, which when executed by a source device, cause the source device to:

allocate a portion of operational power in the source device to an external sink device in response to a connection of the external sink device to the source device;

detect a low power state with respect to the external sink device including determining that a battery capacity of the external sink device has exceeded a threshold; and decrease the portion of operational power allocated to the external sink device and cause a processing unit to increase a maximum turbo boost limit of the source device based on the decreased portion of operational power allocated to the external sink device in response to the low power state.

6. The at least one computer readable storage medium of claim 5, wherein the instructions, when executed, further cause the source device to switch the source device to a standby rail based on the decreased portion of operational power allocated to the external sink device.

7. The at least one computer readable storage medium of claim 5, wherein to detect the low power state, the instructions, when executed, further cause the source device to track a power consumption measurement with respect to the external sink device.

8. The at least one computer readable storage medium of claim 5, wherein the portion of operational power is to be allocated to the external sink device in accordance with one or more of an explicit power setting or an implicit power setting.

9. A semiconductor apparatus comprising:

one or more substrates; and logic coupled to the one or more substrates, wherein the logic is implemented at least partly in one or more of configurable or fixed-functionality hardware, the logic to:

allocate a portion of operational power in a source device to an external sink device in response to a connection of the external sink device to the source device;

detect a low power state with respect to the external sink device including determining that a battery capacity of the external sink device has exceeded a threshold; and decrease the portion of operational power allocated to the external sink device and cause the logic to increase a maximum turbo boost limit of the source device based on the decreased portion of operational power allocated to the external sink device in response to the low power state.

10. The semiconductor apparatus of claim 9, wherein the logic is further to switch the source device to a standby rail based on the decreased portion of operational power allocated to the external sink device.

11. The semiconductor apparatus of claim 9, wherein to detect the low power state, the logic is to track a power consumption measurement with respect to the external sink device.

12. The semiconductor apparatus of claim 9, wherein the portion of operational power is to be allocated to the external sink device in accordance with one or more of an explicit power setting or an implicit power setting.

13. A method comprising:

allocating a portion of operational power in a source device to an external sink device in response to a connection of the external sink device to the source device;

detecting a low power state with respect to the external sink device including determining that a battery capacity of the external sink device has exceeded a threshold; and decreasing the portion of operational power allocated to the external sink device and causing a processing unit to increase a maximum turbo boost limit of the source device based on the decreased portion of operational power allocated to the external sink device in response to the low power state.

14. The method of claim 13, further including switching the source device to a standby rail based on the decreased portion of operational power allocated to the external sink device.

15. The method of claim 13, wherein detecting the low power state includes tracking a power consumption measurement with respect to the external sink device.

16. The method of claim 13, wherein the portion of operational power is allocated to the external sink device in accordance with one or more of an explicit power setting or an implicit power setting.

* * * * *